Patented Nov. 5, 1940

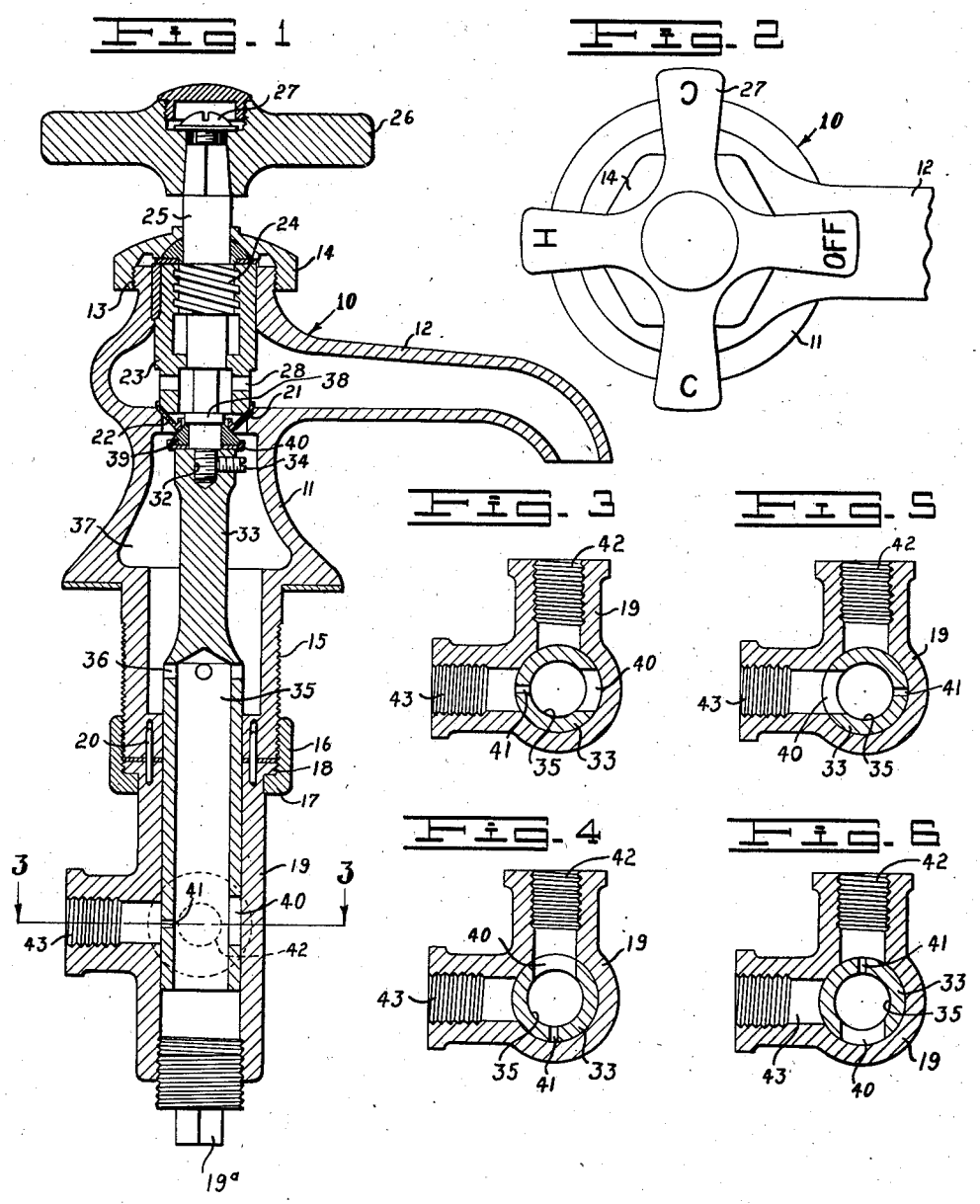

2,220,170

UNITED STATES PATENT OFFICE 2,220,170

VALVE

Harold L. Nelson, Pasadena, Calif.

Application April 24, 1939, Serial No. 269,601

1 Claim. (Cl. 277—18)

This invention relates to valves.

The general object of the invention is to provide an improved valve for controlling the flow of hot and cold water.

A more specific object of the invention is to provide a novel single valve member so constructed and arranged that the flow from its pipes may be controlled thereby.

A further object of the invention is to provide a novel mixing valve including a novel axially shiftable and rotatable valve member for controlling the flow from a plurality of pipes.

Other objects and the advantages of this invention will be apparent from the following description taken in connection with the accompanying drawing, wherein:

Fig. 1 is a central sectional view through a valve embodying the features of my invention;

Fig. 2 is a fragmentary top plan view of the valve; and

Figs. 3, 4, 5 and 6 are sections taken on line 3—3, Fig. 1 and showing the valve member in different positions.

Referring to the drawing by reference characters I have shown my invention as embodied in a valve which is indicated generally at 10. As shown the valve includes an upper body 11 having a discharge spout 12 and having external threads 13 at the upper end to threadedly engage a cap 14. The lower portion of the body 14 is threaded to receive a coupling 16 which includes a flange 17 engaging a flange 18 on a sleeve 19. The collar 17 serves to hold the parts assembled and the correct relationship of the parts is shown as secured by pins 20.

The body portion includes an internal bevelled portion 21 which is engaged by a bevelled surface or a disk which is engaged by a valve member 23 which is threaded internally at its upper end to match threads 24 on a valve stem 25. A suitable handle member 26 is secured to the valve stem as by a screw 27.

The valve member 23 slidably and rotatably receives the stem 25 and the lower portion of this member is hollow and includes lateral outlets 28 communicating with the spout 12. The lower end of the stem 25 is threaded as at 32 and receives the upper portion of a stem 33 with the parts held in correct position by a set screw 34.

The stem 33 has a hollow lower portion 35 and has lateral outlets 36 which afford communication between the hollow portion and a chamber 37 in the body.

The stem 25 includes a collar 38 which forms a shoulder against which is seated a gasket 39 having a flanged disk 40 thereon engaging the end of the stem portion 33 and held in place by the threaded coupling 32. The construction is such that when the handle 26 is rotated in an anti-clockwise direction the valve stem is lowered thus moving the gasket 39 away from its seat and allowing fluid to pass from the chamber 35 to the chamber 37 and to the spout 12.

The lower portion of the valve stem 33 includes an enlarged inlet 40 and a smaller inlet 41 which is substantially diametrically opposed to the inlet 40. The portion 19 includes an inlet 42 and an inlet 43 which are shown as arranged at right angles to each other. The inlets 40 and 41 are adapted to be aligned with the inlets 42 and 43 when the valve handle is rotated.

In Fig. 3 the stem 33 is shown in the position it occupies when the gasket 39 engages its seat. When the valve is rotated in an anti-clockwise direction from this position the cold water inlet 40 gradually becomes aligned with the outlet 42 as the valve is raised and this occurs as the valve stem is lowered moving the gasket 39 from its seat and allowing cold water to pass to the spout 12 further opening the valve. Further turning of the valve stem gradually opens the opening 40 to the hot water inlet 43 thus mixing hot and cold water. Further rotation of the valve stem moves the parts to the position shown in Fig. 5 wherein the cold water is shut off entirely and the hot water is running fully. From the hot water position should the operator carelessly turn the valve handle in the wrong direction to the position shown in Fig. 6, the smaller inlet 41 will be aligned with the cold water inlet thus causing a dribble which would be noticeable to the operator who would immediately turn the valve in a reverse direction to the position shown in Fig. 3 where the gasket 39 tightly engages its seat.

From the foregoing description it will be apparent that I have invented a novel valve which is highly efficient for the intended purpose.

I claim:

In a valve, a body having a chamber and a spout and having a valve seat between the chamber and the spout, a valve movable towards and from the seat, said valve having a hollow cylindrical stem portion on the lower end thereof, a removable sleeve on said valve body, said sleeve including a shoulder, a collar engaging said shoulder and said valve body to hold the sleeve in position, aligning means on said sleeve and valve body, said cylindrical stem portion extending into said sleeve, said cylindrical stem portion including apertures affording communication between said stem and said chamber, said sleeve having a drain aperture in the lower end thereof and a plug for said aperture, the interior of said stem communicating with said drain aperture, said sleeve including coplanar inlets in the sides thereof with their axes disposed at right angles to each other, said cylindrical stem portion having a relatively large aperture therethrough and a diametrically opposed relatively small aperture, said last two mentioned apertures being adapted to be aligned with said inlets.

HAROLD L. NELSON.